United States Patent
Dey et al.

(10) Patent No.: US 9,905,248 B2
(45) Date of Patent: Feb. 27, 2018

(54) INFERRING USER INTENTIONS BASED ON USER CONVERSATION DATA AND SPATIO-TEMPORAL DATA

(71) Applicant: International Business Machines Corporation, Armonk, NY (US)

(72) Inventors: Prasenjit Dey, Bangalore (IN); Vijay Ekambaram, Bangalore (IN); Vikas V. Joshi, Bangalore (IN); Ramasuri Narayanam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/056,067

(22) Filed: Feb. 29, 2016

(65) Prior Publication Data

US 2017/0249956 A1     Aug. 31, 2017

(51) Int. Cl.
*G10L 15/00* (2013.01)
*G10L 21/00* (2013.01)
(Continued)

(52) U.S. Cl.
CPC ............ *G10L 25/48* (2013.01); *G06F 17/278* (2013.01); *G10L 15/24* (2013.01); *G10L 15/26* (2013.01)

(58) Field of Classification Search
CPC ....... G10L 15/22; G10L 15/26; G10L 15/265; G10L 15/30; G10L 21/00
(Continued)

(56) References Cited

U.S. PATENT DOCUMENTS 6,381,465 B1 * 4/2002 Chern .................... H04L 51/38
340/7.21
6,973,428 B2    12/2005 Boguraer et al.
(Continued)

FOREIGN PATENT DOCUMENTS

EP      1538535 A3    6/2005
EP      2784774 A1    1/2014
(Continued)

OTHER PUBLICATIONS

Antoine Laurent†§, Teva Merlin†, Sylvain Meignier†, Yannick Esteve†, Paul Del'eglise, "Iterative Filtering of Phonetic Transcriptions of Proper Nouns", ICASSP 2009.
(Continued)

*Primary Examiner* — Edgar Guerra-Erazo
(74) *Attorney, Agent, or Firm* — Ryan, Mason & Lewis, LLP

(57) ABSTRACT

Systems and methods are provided for inferring explicit user intentions based on user conversation data and associated spatial-temporal data of the user. For example, a method includes detecting a named entity in a conversation of a user communicating on a mobile computing device of the user, obtaining spatio-temporal information associated with the user, wherein the spatio-temporal information comprises information regarding one or more locations of the user and timing of the user's presence at the one or more locations, and utilizing the spatio-temporal information to disambiguate the named entity detected in the conversation of the user. The disambiguated named entity and the spatio-temporal data associated with the user are utilized to determine user intentions and to generate or update user profile information associated with the user.

12 Claims, 6 Drawing Sheets

(51) Int. Cl.
*G10L 25/48* (2013.01)
*G10L 15/26* (2006.01)
*G10L 15/24* (2013.01)
*G06F 17/27* (2006.01)

(58) Field of Classification Search
USPC .......... 704/235, 243, 246, 270, 270.1, 275
See application file for complete search history.

(56) References Cited

U.S. PATENT DOCUMENTS

| | | | |
|---|---|---|---|
| 7,797,305 | B2 | 9/2010 | Basson et al. |
| 7,904,294 | B1* | 3/2011 | Rose ............... G10L 15/08 704/231 |
| 8,340,974 | B2 | 12/2012 | Zurek et al. |
| 8,407,048 | B2 | 3/2013 | Rogers |
| 8,560,301 | B2* | 10/2013 | Kim ............... G06F 17/2705 704/10 |
| 2002/0087525 | A1* | 7/2002 | Abbott ............ G06F 17/30867 |
| 2003/0069991 | A1* | 4/2003 | Brescia ........... G06F 17/3087 709/245 |
| 2003/0079024 | A1* | 4/2003 | Hough ............ G06Q 10/10 709/227 |
| 2003/0125869 | A1* | 7/2003 | Adams, Jr. ...... G01C 21/20 701/532 |
| 2004/0243417 | A9* | 12/2004 | Pitts, III ......... G06F 17/3043 704/276 |
| 2005/0102149 | A1* | 5/2005 | Yacoub ........... G10L 15/22 704/277 |
| 2006/0235694 | A1* | 10/2006 | Cross ............. G06F 17/30861 704/270.1 |
| 2011/0035445 | A1* | 2/2011 | Eickhoff .......... G06Q 10/10 709/204 |
| 2013/0005478 | A1 | 1/2013 | McCaffery et al. |
| 2013/0095458 | A1 | 4/2013 | Cha et al. |
| 2013/0144605 | A1 | 6/2013 | Brager et al. |
| 2013/0198197 | A1 | 8/2013 | Sawhney et al. |
| 2013/0246049 | A1 | 9/2013 | Mirhahi |
| 2014/0136323 | A1 | 5/2014 | Zhang et al. |
| 2014/0324431 | A1* | 10/2014 | Teasley .......... G10L 15/22 704/246 |

FOREIGN PATENT DOCUMENTS

| | | |
|---|---|---|
| WO | 2009101954 A1 | 8/2009 |
| WO | 2012135783 | 10/2014 |

OTHER PUBLICATIONS

Maximilian Bisani and Hermann Ney, "Open Vocabulary Speech Recognition with Flat Hybrid Models", Eurospeech 2005.
Issam Bazzi and James R. Glass. "Modeling Out-of-Vocabularywords for Robust Speech Recognition," Jun. 2002, Massachusetts Institute of Technology, pp. 1-153.
Long Qin, "Learning Out-of-VocabularyWords in Automatic Speech Recognition", PhD Thesis, CMU, 2013.
Anuj Kumar et al., Rethinking Speech Recognition on Mobile Devices, IUI4DR, Feb. 13, 2011, pp. 1-6.
Nexiwave, Voicemail to Text, Keyword Spotting Engine, 2016, pp. 1-2, http://nexiwave.com/index.php/site-map/keyword-spotting-engine.
Application Developers, Integrate Text to Speech and Speech Recognition, 2009-2016, pp. 1-2, https://www.ispeech.org/developers.
Zou, S., IP.com, Method and system of publishing and sharing mood status for users of mobile phone, IPCOM000210015D, Aug. 2011.
Cohen, J., Embedded speech recognition applications in mobile phones: Status, trends, and challenges, IEEE International Conference on Acoustics, Speech and Signal Processing, 2008. ICASSP 2008. Date Mar. 31, 2008-Apr. 1, 2008 pp. 5352-5355.
U.S. Appl. No. 14/737,886, filed Jun. 12, 2015 and entitled, Transferring Information During a Call.

\* cited by examiner

INFERRING USER INTENTIONS BASED ON USER CONVERSATION DATA AND SPATIO-TEMPORAL DATA

FIELD

This disclosure relates generally to data processing and, in particular, to systems and methods for predicting user intentions and preferences for use in providing intelligent recommendations by a computing platform.

BACKGROUND

In various types of applications, user profile information is typically utilized to identify user interests and provide recommendations to users. For example, user profiles can be automatically generated by analyzing cookies, web pages visited, user interactions on social networks, and other online user activity. While various methods have been developed for analyzing user information to create user profiles, such methods often result in the creation of user profiles with incomplete or inadequate information with regard to user interests and preferences, which can lead to ambiguity and irrelevant recommendations.

SUMMARY

Embodiments of the invention generally include systems and methods for inferring explicit user intentions based on user conversation data and associated spatial-temporal data of the user. For example, in one embodiment, a method includes detecting a named entity in a conversation of a user communicating on a mobile computing device of the user, obtaining spatio-temporal information associated with the user, wherein the spatio-temporal information comprises information regarding one or more locations of the user and timing of the user's presence at the one or more locations, and utilizing the spatio-temporal information to disambiguate the named entity detected in the conversation of the user.

In another embodiment, a method includes temporarily buffering one or more portions of a voice conversation of a user communicating on a mobile computing device of the user, and performing automatic speech recognition on the buffered portions of the voice conversation to detect a named entity in the voice conversation of the user. Spatio-temporal information associated with the voice conversation is obtained, wherein the spatio-temporal information comprises information regarding one or more locations of the user and timing of the user's presence at the one or more locations. Obtaining the spatio-temporal information comprises (i) determining spatio-temporal contextual information from at least one of one or more keywords and one or more phrases in the voice conversation which are detected as a result of the automatic speech recognition on the buffered portions of the voice conversation; and (ii) obtaining spatio-temporal information from one or more location services executing on the mobile computing device based on the determined spatio-temporal contextual information. The spatio-temporal information is utilized to disambiguate the named entity detected in the conversation of the user.

In other embodiments of the invention, the disambiguated named entity and the spatio-temporal data associated with the user are utilized to determine user intentions and to generate or update user profile information associated with the user.

Other embodiments will be described in the following detailed description of embodiments, which is to be read in conjunction with the accompanying figures.

DETAILED DESCRIPTION OF EMBODIMENTS

Embodiments will now be discussed in further detail with regard to systems and methods for determining or otherwise inferring user intentions based on an analysis of user conversation data (e.g., voice calls, text messaging, etc.) and associated spatial-temporal data of the user (e.g., user locations, time of location, proximity data, etc.). For example, techniques are provided to extract named entities from user conversations and to correlate the named entities with the user's future and/or past spatio-temporal data to disambiguate the named entities. In addition, user intentions (e.g., a reason for a user visiting a given location) are determined based on one or more disambiguated named entities and the spatio-temporal data associated with the user. Moreover, user profile information (e.g., user interests) of a given user can be generated or updated based on the disambiguated named entity and the spatio-temporal data associated with the user.

Figure 1:
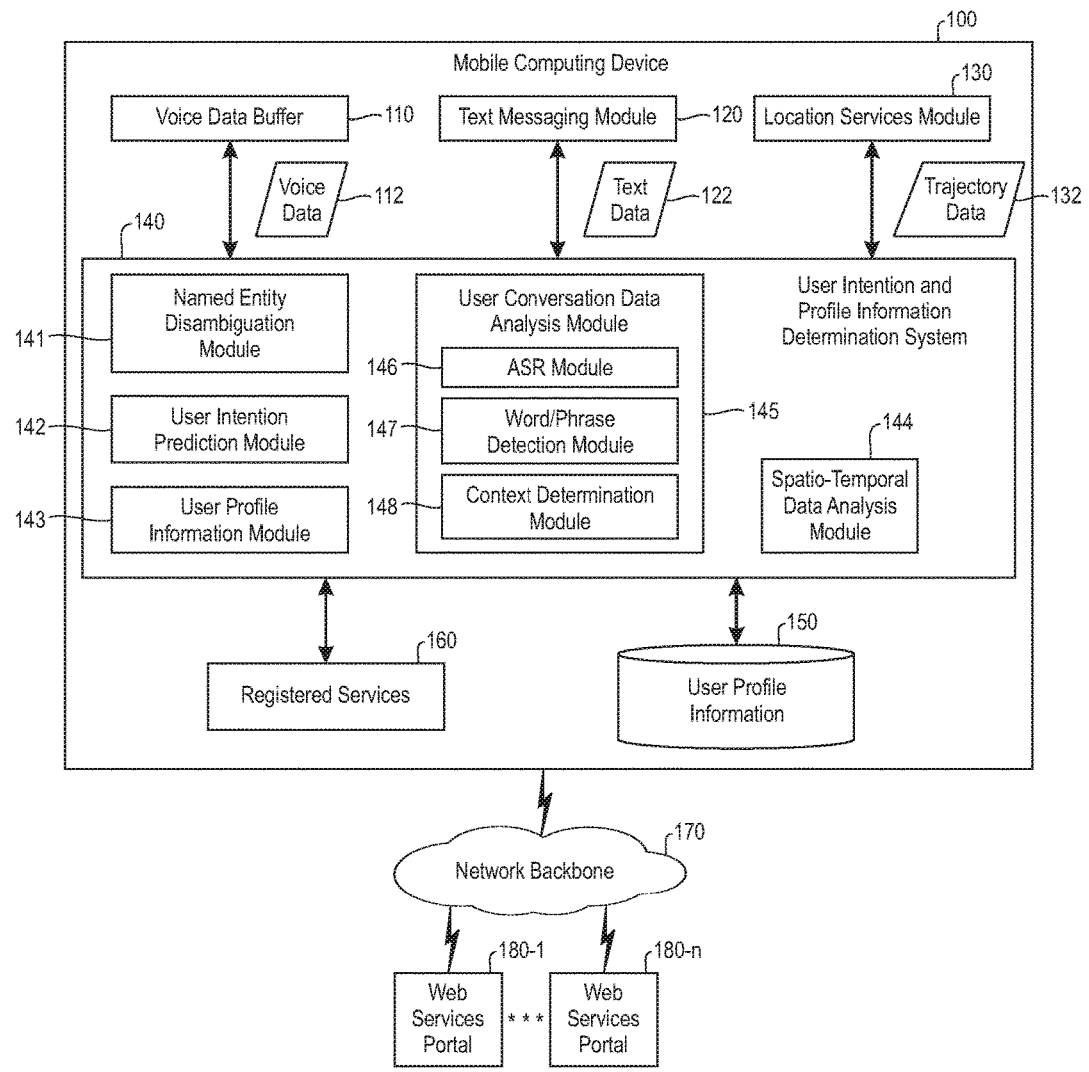
FIG. 1 schematically illustrates a system that is configured to determine user intentions from user conversation data and user spatio-temporal data, according to an exemplary embodiment of the invention.

FIG. 1 schematically illustrates a system that is configured to determine user intentions from user conversation data and user spatio-temporal data, according to an exemplary embodiment of the invention. In particular, FIG. 1 schematically illustrates a system comprising a mobile computing device 100 having various components that collectively operate to capture and analyze user conversation data (e.g., voice data and/or text data) and user spatio-temporal data, and to derive explicit user intensions and user profile information based on the analyzed data. As shown in FIG. 1, the mobile computing device 100 comprises a voice data buffer 110, a text messaging module 120, a location services module 130, a user intention and profile information determination system 140, a data store of user profile information 150, and one or more registered services 160 (e.g., applications) that execute on the mobile computing device 100. In addition, the user intention and profile information determination system 140 comprises a named entity disambiguation module 141, a user intention prediction module 142, a user profile information module 143, a spatio-temporal data analysis module 144, and a user conversation data analysis module 145. The user conversation data analysis module 145 comprises an automatic speech recognition (ASR) module 146, a word/phrase detection module 147, and a context determination module 148.

The mobile computing device 100 may be any type of computing device (e.g., smart phone, electronic tablet, laptop computer, etc.) that is configured to enable a user to communicate by voice and/or text messaging, for example, with other individuals using computing devices over a communications network 170. The communications network 170 may comprise any type of communications network (or combinations of networks), such as a global computer network (e.g., the Internet), a wide area network (WAN), a local area network (LAN), a satellite network, a telephone or cable network, a cellular network, a wireless network such as Wi-Fi™ or WiMAX, or various portions or combinations of these and other types of networks. Furthermore, the mobile computing device 100 can be utilized to access one or more web services portals 180-1, . . . , 180-n (collectively referred to as web service portals 180). The web services portals 180 comprise web sites or services that offer different types of resources or services such as search engines, online shopping, etc. The registered services 160 comprise client-side applications, which are associated with the one or more of the web services portals 180 to allow the user profile information 150 to be utilized in conjunction with the services/resources provided by the web services portals 180. The registered services 160 are registered and/or permitted to access and utilize the user profile information 150 through an application permissions module/component of a native operating system of the mobile computing device 100, for example.

The voice data buffer 110 comprises a portion of physical memory of the mobile computing device 100 which is configured to temporarily store voice data of a user which are captured when the user is engaged in a voice conversation/communication (e.g., a phone call, a video call, a voice over internet protocol (VoIP) call, etc.) using the mobile computing device 100. The voice data buffer 110 temporarily stores voice data 112, which are accessed and processed by the user intention and profile information determination system 140 for predicting user intentions and generating/updating user profile information.

The text messaging module 120 comprises an application/service that executes on the mobile computing device 100 to support messaging services. For example, the text messaging module 120 can include a messaging application that enables a user to generate and send text communications to computing devices of other individuals over the communications network 170. In one or more embodiments of the invention, the mobile computing device 100 is configured to persistently maintain text messages on the mobile computing device 100. Additionally, the user intention and profile information determination system 140 can be configured to access and process text data 122 from text messages that are generated and/or maintained on the mobile computing device 100 for use in predicting user intentions and generating/updating user profile information 150.

The location services module 130 comprises an application/service that executes on the mobile computing device 100 to support location services. For instance, in one or more embodiments of the invention, the location services module 130 operates in conjunction with a global positioning satellite (GPS) system to determine and track the physical locations (e.g., latitude and longitudinal coordinates) and times of such physical locations of the mobile computing device 100. The location services module 130 generates trajectory data 132, which represent the mobility of the mobile computing device 100 and, consequently, the mobility of the user of the mobile computing device 100. In one or more embodiments of the invention, the trajectory data 132 may be stored as a sequence of n data points (Trajectory-1, Trajectory-2, . . . Trajectory-n), wherein each trajectory data point comprises location information (latitude, longitude) and associated location time information. In one or more embodiments of the invention, the user intention and profile information determination system 140 can be configured to access and process the trajectory data 132 generated by the location service module 130 for use in predicting user intentions and generating/updating user profile information 150.

The user conversation data analysis module 145 accesses and processes the voice data 112 and/or text data 122 to extract relevant information from the conversation data of a given user. The information extracted from the user conversation data is utilized in conjunction with the user's past/future spatio-temporal data, which are extracted by the spatio-temporal data analysis module 144, to determine or otherwise predict user intentions/interests and create/update the user profile information 150.

More specifically, the ASR module 146 implements a speech recognition system that is configured to process the voice data 112 and transcribe the voice data 112 (or portions of the voice data 112) to text data. The word/phrase detection module 147 is configured to detect certain keywords and/or phrases in the user conversation data (e.g., text data 122, transcribed voice data 112, etc.), which provide relevant information regarding user intentions and interests. For example, in one or more embodiments of the invention, the word/phrase detection module 147 is configured to detect named entities, action phrases, time information, and other words/phrases in the user conversation data, which can be utilized to provide context for determining user intentions, interests, etc. The context determination module 148 is configured to determine additional context information with regard to detected keywords/phrases of the user conversation data, wherein the additional contextual information is used to support functions of the spatio-temporal data analysis module 144 and the named entity disambiguation module 141.

The word/phrase detection module 147 can implement one or more key-word spotting techniques to detect specific keywords or phrases in text data (e.g., transcribed voice data or text data 122). By way merely of example, the word/phrase detection module 147 can be configured to detect certain keywords or phrases associated with real estate (e.g., property, buy house, buy an apartment buy a flat, etc.). The context determination module 148 is configured to identify and/or extract certain attributes associated with the target keywords/phrases. For example, with regard to real estate, certain attributes, such as location, type of house, flat, etc., can provide further context that can be used to disambiguate named entities and/or determine user interests/preferences, etc. In this regard, the context determination module 148 can extract certain context around the detected keywords/phrases to determine one or more attributes associated with the detected keywords/phrases.

The spatio-temporal data analysis module 144 is configured to process the user trajectory data 132 and other mobility or proximity data associated with the user to obtain spatio-temporal data. For example, analyzing the user trajectory data 132 and user proximity data can provide various types of useful spatio-temporal information, including, but not limited to: (i) locations that a user visited (e.g., shopping malls, restaurants, etc.); (ii) paths that are frequently traveled by the user; (iii) the times at which the user visits certain locations; (iv) mode(s) of transportation of the user (e.g., the user's own vehicle, public transportation, etc.); (v) commonly visited places and places of interest, etc. The spatio-temporal information is utilized by the named entity disambiguation module 141 to disambiguate named entities detected in user conversation data and utilized by the user intention prediction module 142 to predict user intentions and interests.

As such, the named entity disambiguation module 141 is configured to disambiguate named entities that are detected in the user conversation data. In particular, the named entity disambiguation module 141 implements methods to correlate the named entities (and other contextual information) extracted from the user conversation data (e.g., voice data 112 and/or text data 122) with spatio-temporal information (provided by the spatio-temporal data analysis module 144) to disambiguate named entities detected by the user conversation data analysis module 145.

By way of specific example, user conversation data typically include named entities such as names of locations (e.g., cities, towns, popular vacation location, etc.), names of organizations, names of restaurants, names of stores, and names of other types of entities. The named entities in user conversation data provide information regarding user intentions and interests. For example, user conversation data can indicate that a given user is going to a certain store or shopping mall (or other location) to purchase an item or meet a friend, or having lunch or dinner at a certain restaurant, etc. While the user conversation data analysis module 145 can detect named entities in the user conversation data, it can be difficult to determine the correct names of such entities.

For example, when processing the voice data 112 using the ASR system 146, the names of spoken entities may be nouns that are out-of-vocabulary (OOV) words, that is, words that are not part of the vocabulary of the ASR system 146. Moreover, with voice data, the user may pronounce certain named entities incorrectly, wherein such pronunciation errors prevent the ASR system 146 from correctly determining the names of the spoken entities. Moreover, for textual data 122, the user may inadvertently misspell the names of certain entities. Under these circumstances, ambiguity can exist with regard to the correct name of a given entity detected in the user conversation data.

In one or more embodiments of the invention, the named entity disambiguation module 141 can utilize the user trajectory data/proximity data to resolve these ambiguities in named entities. For, example, GPS location and time information can be utilized to resolve ambiguities in named entities that correspond to names of locations visited by the user. For example, the conversation data of a user may reveal that the user was at a given location at a specified time. In this example, the name of the given location can be determined/disambiguated by analyzing the user's trajectory data 132 to determine the user's location at the specified time. Further, in one or more embodiments of the invention, the named entity disambiguation module 141 can correlate certain contextual spatio-temporal information that is determined via the context determination module 148 using certain keywords/phrases that are detected in the transcribed voice data 112 and/or text data 122 by the word/phrase detection module 147.

The user intention prediction module 142 is configured to utilize disambiguated named entities, contextual information and/or spatio-temporal data to predict or otherwise determine user intentions and interests from the user conversation data. For example, the user intention prediction module 142 can analyze disambiguated named entities in conjunction with contextual information extracted from the user conversation data to determine the context and/or purpose of the user visiting a certain named location. By way of further example, the user intention prediction module 142 can analyze the user's trajectory data 132 to determine a preferred mode of transportation of the user, wherein if a user's default mode of transportation is a public bus/train, then it can be determined that a locality preference of the user is in an area of good public transit and connectivity.

The user profile information module 143 is configured to utilize the user preference/interest information as determined by the user intention prediction module 143 to create or otherwise update user profile information in the data store 150. For example, assume that a user had a call conversation with someone and stated "I am in restaurant, will call you later." The various system modules (e.g., 145, 144, 141), as discussed above, can determine that the user is in a restaurant and use trajectory data 132 (e.g., GPS coordinates) to determine the information regarding the restaurant (e.g., name and location). With this specific information, the user profile information module 143 can access remote data sources to obtain additional information about the restaurant (e.g., cuisine type, rating, costs, etc.) and update the user profile information 150 with such information (e.g., type of food that the user prefers, etc.). As noted above, the user profile information 150 can be utilized by the registered services 160 to provide smart recommendations to the user.

Figure 2:
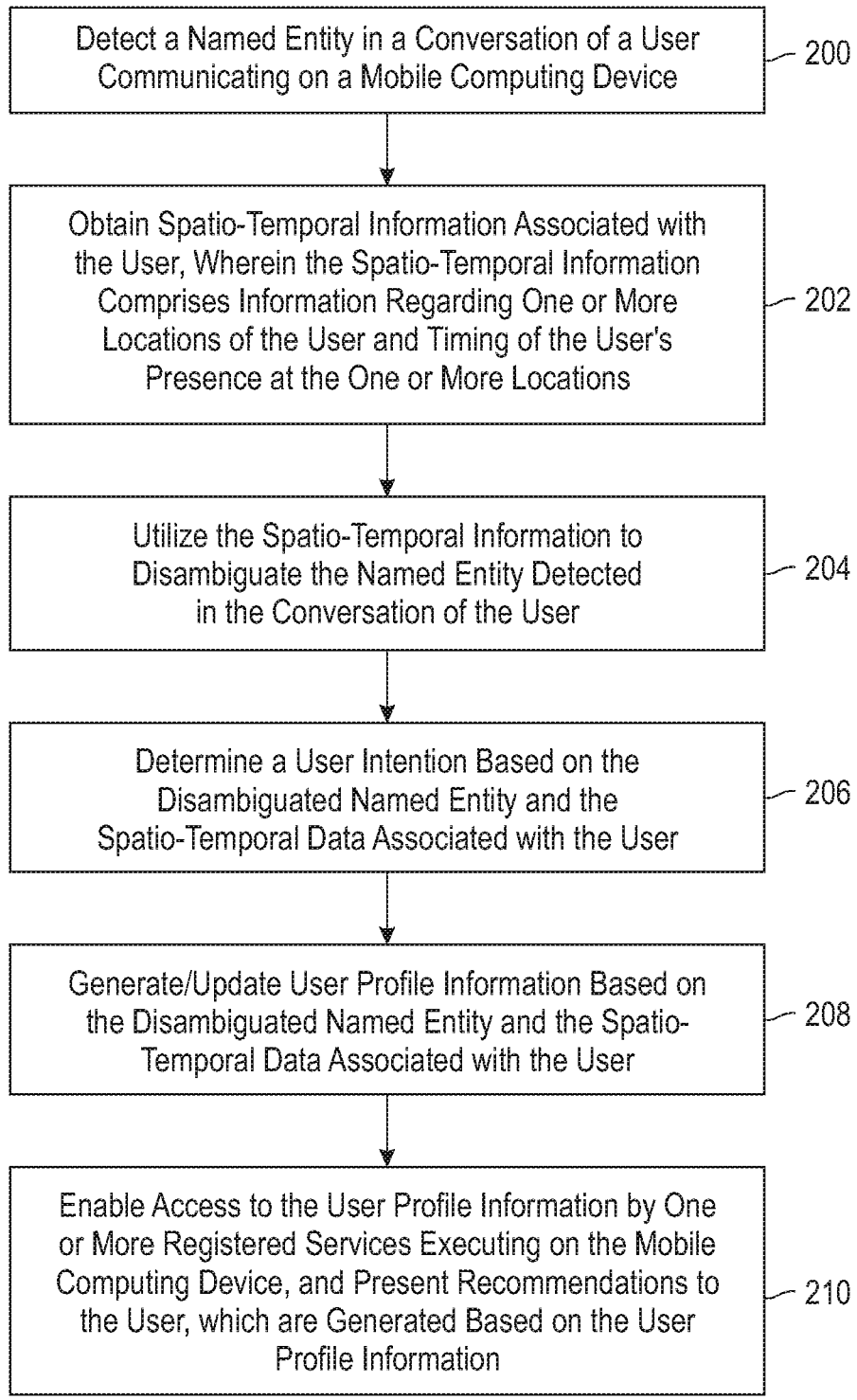
FIG. 2 is a flow diagram of a method to determine user intentions and preferences based on user conversation data and user spatio-temporal data, according to an exemplary embodiment of the invention.

FIG. 2 is a flow diagram of a method to determine user intentions and preferences based on user conversation data and user spatio-temporal data, according to an exemplary embodiment of the invention. In one or more embodiments of the invention, the method of FIG. 2 illustrates operating modes of the user intention and profile information determination system 140 of FIG. 1. As such, for illustrative purposes, the process flow of FIG. 2 will be discussed with reference to various system components as shown in FIG. 1. Referring to FIG. 2, an initial step in the process flow comprises detecting a named entity in a conversation of a user communicating on a mobile computing device of the user (block 200). In one or more embodiments of the invention, as noted above, the user conversation data analysis module 145 is configured to detect named entities and other keywords in conversation data of a user by processing voice data 112 and/or text data 122 of the user when communicating on the mobile computing device 100.

Next, spatio-temporal information associated with the user is obtained (via the spatio-temporal data analysis module 144), wherein the spatio-temporal information comprises information regarding one or more locations of the user and timing of the user's presence at the one or more locations (block 202). In one or more embodiments of the invention, the spatio-temporal information associated with the user can include actual trajectory data 132 obtained from the location services 130 executing on the mobile computing device 100. In another embodiment of the invention, the spatio-temporal information can include spatio-temporal contextual information extracted (via the context determination module 148) from keywords and/or phrases detected in the user's conversation data.

More specifically, in one or more embodiments of the invention, a process of obtaining the spatio-temporal information comprises (i) determining spatio-temporal contextual information from keywords and/or phrases in a voice conversation of the user which are detected as a result of automatic speech recognition on portions of the voice conversation, and (ii) obtaining actual spatio-temporal information (e.g., trajectory data 132 or GPS data) from the location services executing on the mobile computing device based on the determined spatio-temporal contextual information. In one example embodiment, the process of determining spatio-temporal contextual information from keywords and/or phrases in the voice conversation of the user can include determining a timeframe based on temporal contextual information determined from the voice conversation of the user. The timeframe can be determined based on explicit time information detected in the voice conversation (e.g., "I will meet you at 8:30 pm"), or the timeframe can be determined or otherwise extracted or implied from the conversation data. For example, the detected word "lunch" in the conversation "Let's meet for lunch today" can imply a timeframe of around 11:00 am to 3:00 pm, as such timeframe is typical of the time that people ordinarily have lunch.

In addition, the process of obtaining actual spatio-temporal information based on the determined spatio-temporal contextual information includes, for example, obtaining GPS data corresponding to the determined timeframe. For example, in one or more embodiments of the invention, the process of obtaining GPS data corresponding to the determined timeframe includes obtaining previously collected GPS data (or past GPS data) corresponding to the determined timeframe. In another embodiment, the process of obtaining GPS data corresponding to the determined timeframe can include setting a trigger to collect GPS data at a future time (future GPS data) corresponding to the determined timeframe.

The spatio-temporal information (e.g., past and/or future GPS data) can be utilized to disambiguate the named entity detected in the conversation of the user (block 204). A user intention can be determined (via the user intention prediction module 142) from the user conversation data based on based on the disambiguated named entity and the spatio-temporal data associated with the user (block 206). For example, a user intention may include a reason for the user visiting a given location (wherein the given location is the disambiguated named location, for example).

Next, user profile information 150 is generated and/or updated based on the disambiguated named entity and the spatio-temporal data associated with the user (block 208). Access to the user profile information 150 can be granted to one or more registered services 160 executing on the mobile computing device 100, wherein the profile information is utilized by the registered services 160 to generate and present recommendations to the user on the mobile computing device based on the user profile information 150 (block 210).

Figure 3:
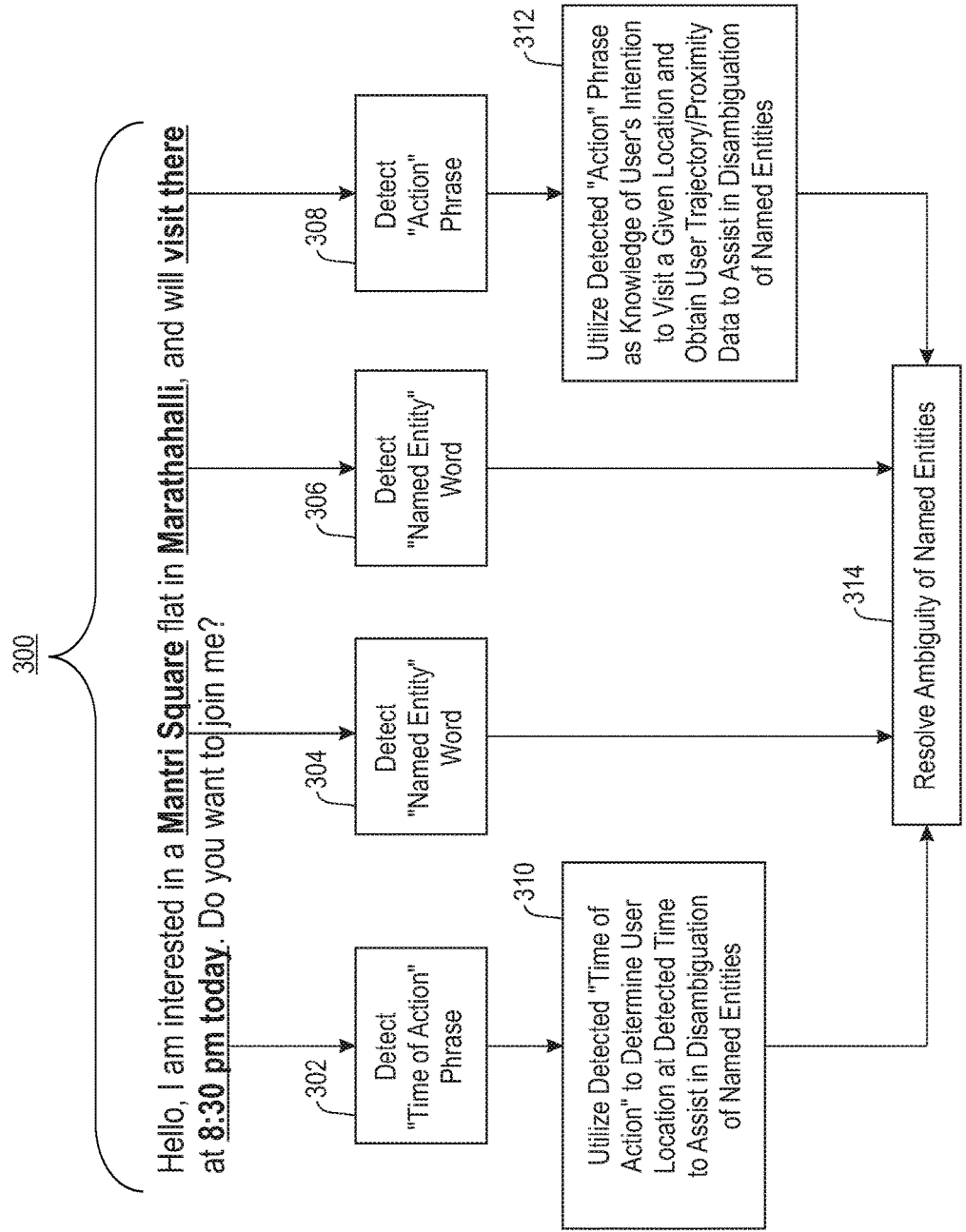
FIG. 3 illustrates a method for disambiguating a named entity in a user conversation according to an exemplary embodiment of the invention.

Example process flows, which are based on the method of FIG. 2, will now be discussed in further detail with reference to FIGS. 3, 4, and 5. For example, FIG. 3 illustrates a method for disambiguating a named entity in a user conversation according to an exemplary embodiment of the invention. In one or more embodiments of the invention, the method of FIG. 3 illustrates an operating mode of the user intention and profile information determination system 140 of FIG. 1. As such, for illustrative purposes, the method of FIG. 3 will be discussed with reference to various system components shown in FIG. 1. FIG. 3 illustrates a portion of user conversation data 300, which are captured on a mobile computing device. The user conversation data 300 shown in FIG. 3 may include text data that are extracted from a text message or text data that are generated by transcribing voice data of the user.

As shown in FIG. 3, an example illustration can include user conversation data 300 that indicate a user's interest in looking at certain real estate (e.g., flat) in a given location (Mantri Square, Marathahalli) at a given time (e.g., 8:30 pm today). The user conversation data 300 are processed by the user conversation data analysis module 145 to detect certain keyword/phrases in the conversation data 300, as well as to extract other relevant contextual information that can be used to disambiguate named entities in the conversation data 300. In particular, in the example of FIG. 3, the word/phrase detection module 147 detects relevant keywords/phrases in the conversation data 300 including, for example, detecting a "time of action" phrase (block 302), detecting "named entities" (blocks 304 and 306), and detecting an "action" phrase (block 308).

In the example of FIG. 3, it is assumed that the named entities, i.e., the named locations Mantri Square and Marathahalli, are deemed ambiguous as they are; e.g., they are OOV words of the ASR system 146. To assist in disambiguating the named entities, the detected "time of action" phrase can be utilized as temporal context to determine the user's actual location at or around the detected "time of action" (8:30 pm today) based on the actual trajectory data 132 of the user (block 310). In addition, the detected "action" phrase (visit there) provides additional context of the user's intention to be at a certain location at the given "time of action", wherein the user's trajectory data/proximity data at or around the specified time of 8:30 pm can be obtained and analyzed to determine the user's location (block 312). In this example, the contextual information provided by the detected "time of action" phrase and the detected "action" phrase is used to determine the user's actual location at or around the specified time of 8:30 pm to assist in the disambiguation of the named entities (block 314). In particular, the contextual information (from blocks 310 and 312) can be input to the named entity disambiguation module 141 and utilized to resolve any ambiguity of the detected named entities (Mantri Square and Marathahalli). For example, the user's GPS coordinates at the specified time may correspond to, or otherwise indicate, a given location Mantri Square, Marathahalli, wherein the user's trajectory data and proximity data are used to disambiguate the detected named entities (in blocks 304 and 306).

Figure 4:
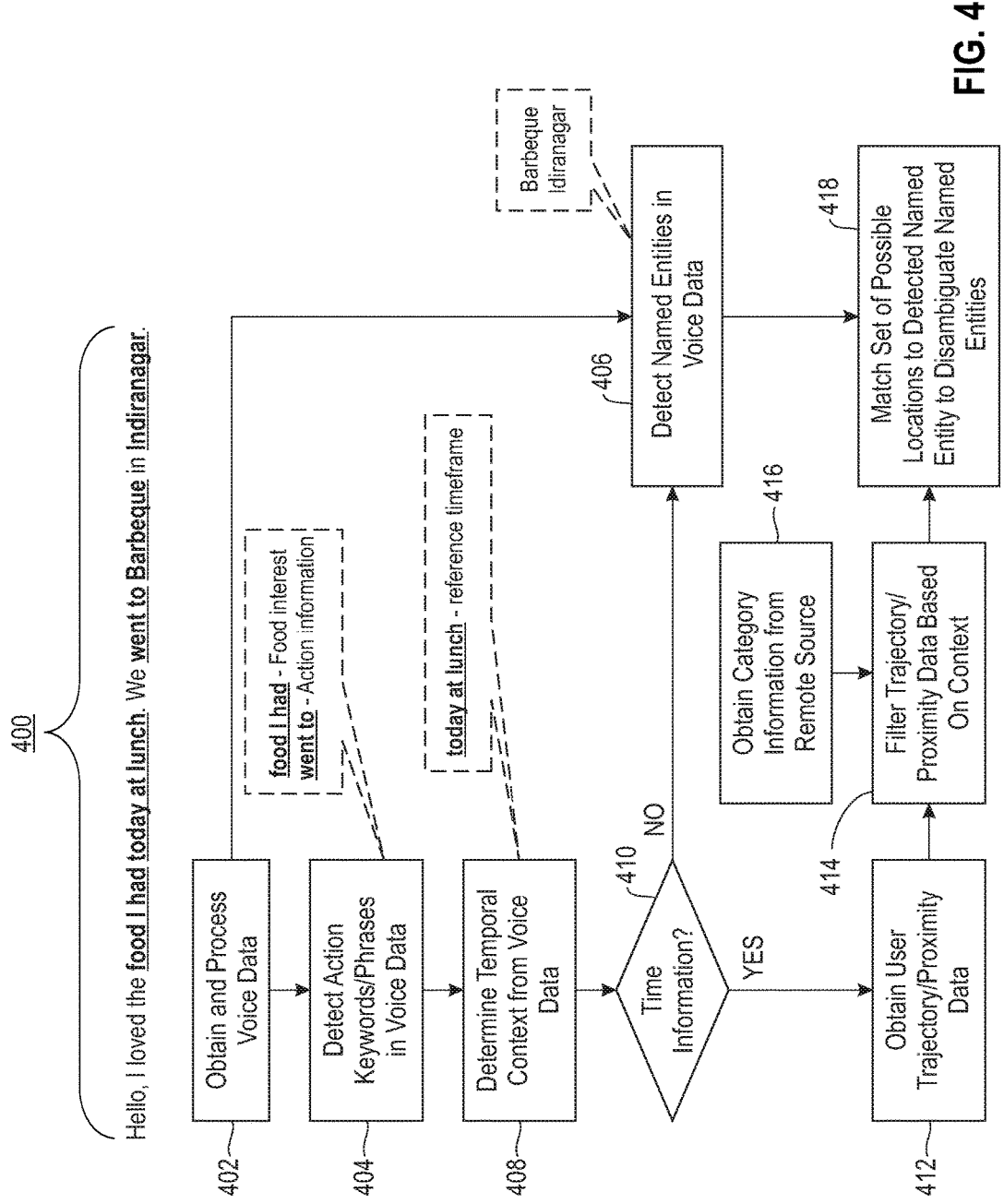
FIG. 4 illustrates a method for disambiguating a named entity in a user conversation according to an exemplary embodiment of the invention.

FIG. 4 illustrates another method for disambiguating a named entity in a user conversation according to an exemplary embodiment of the invention. In one or more embodiments of the invention, the method of FIG. 4 illustrates an operating mode of the user intention and profile information determination system 140 of FIG. 1. As such, for illustrative purposes, the method of FIG. 4 will be discussed with reference to various system components shown in FIG. 1. FIG. 4 illustrates a portion of user conversation data 400, which are captured on a mobile computing device. For illustrative purposes, it is assumed that the user conversation data 400 shown in FIG. 4 include text that is transcribed from voice data via the ASR system 146.

As shown in FIG. 4, the user conversation data 400 indicate that the user visited a certain restaurant (Barbeque), at a location (Indiranagar), at a certain time (today at lunch). The conversation data 400 are derived from voice data, which are obtained from the voice data buffer 110 and processed by the ASR system 146 to transcribe the voice data into text data (e.g., conversation data 400). In one or more embodiments of the invention, the voice data 112 include portions of a voice conversation of the user communicating on the mobile computing device of the user, which are temporarily buffered in the voice data buffer 110, and then deleted after being processed by the ASR system 146. This allows the user's voice data to be processed with minimal privacy concerns, wherein the voice data are not transmitted to a remote system and the user's voice conversation is buffered for small segment and then deleted after keyword detection is performed. In another embodiment, only useful keywords are spotted (eat, visit, cinema, flat etc.). Once voice data analysis is complete, the recorded buffer voice data are deleted, thereby ensuring user privacy.

Also, the voice conversation data 400 are processed to detect action keywords/phrases (block 404) and named entities (block 406) in the voice data. In the example of FIG. 4, the action keywords/phrases include "food I had" (which shows a user's interest in food), and "went to" (which shows that the user visited some location). The detected named entities include "Barbeque" (restaurant name) and "Indiranagar" (location name). In addition, the voice conversation data 400 can be processed to determine temporal context (block 408). In the example of FIG. 4, the phrase "today at lunch" provides temporal contextual information with regard to a given period of time (lunchtime) on a certain date (today), which can be used to disambiguate the named entities. For example, it can be assumed that a standard lunchtime falls within a time period from 11:00 am to 3:00 pm.

If no specific time information or temporal context is detected or otherwise determined from the voice conversation data 400 (negative result in block 410), then the named entities detected in the voice data (block 406) can be matched to a set of possible locations that are related to restaurants and other food establishments to attempt to disambiguate the detected named entities (block 418). On the other hand, if specific time information or temporal context is detected or otherwise determined from the voice conversation data 400 (affirmative result in block 410), then user trajectory/proximity data are obtained (block 412). As noted above, in one or more embodiments of the invention, the trajectory data can include GPS coordinates and associated time information. The user trajectory data and contextual data can be used to filter the trajectory data and determine a relevant timeframe (e.g., a period of time common to have lunch) with which to determine a block of trajectory data that would be relevant to filter target locations having a restaurant (block 414). For this process, category information can be obtained from a remote source (block 416) with regard to restaurants and locations that are potential targets for disambiguating the named entities. The named entities detected in the voice data (block 406) can be matched to a set of possible locations (which set is filtered via block 414) that are related to restaurant and other food establishments to attempt to disambiguate the detected named entities (block 418).

Figure 5:
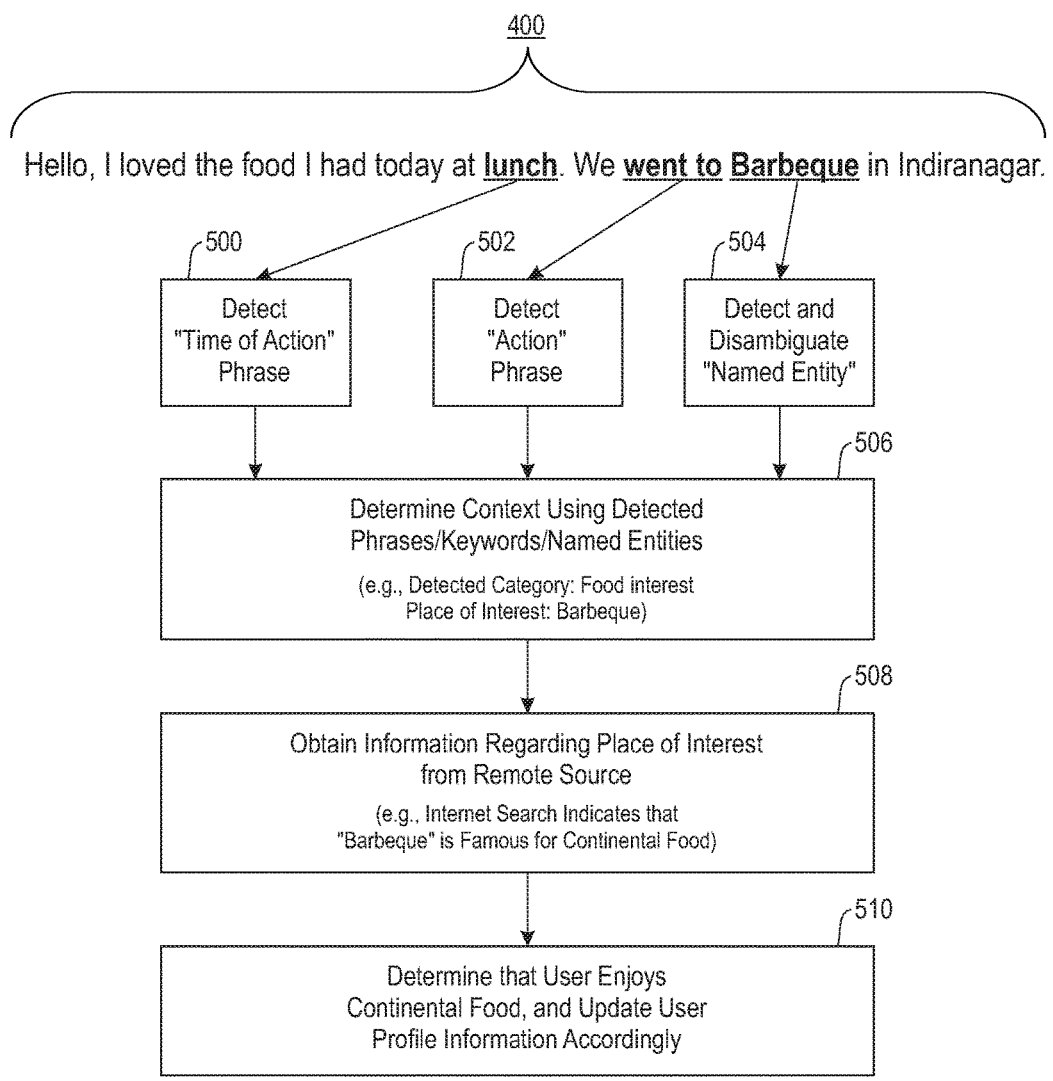
FIG. 5 illustrates a method for updating user profile information based on disambiguated named entities and other context information derived from a user conversation, according to an exemplary embodiment of the invention.

FIG. 5 illustrates a method for updating user profile information based on disambiguated named entities and other context information derived from a user conversation, according to an exemplary embodiment of the invention. In particular, FIG. 5 shows an example method for updating user profile information based on user interests/preferences that are derived from the user conversation data 400 discussed above in FIG. 4. In the example of FIG. 5, it is assumed that the system has detected a "time of action" phrase (today at lunch) (block 500) and an "action" phrase (went to) (block 502), and has detected and disambiguated the named entity "Barbeque" (block 504).

In this process, relevant context is determined using the detected phrases, keywords, and disambiguated (or unambiguous) named restaurant entity (block 506). This context indicates a user's interest in food (a detected category) and a given restaurant (Barbeque). The user profile information module 143 can utilize the context information to obtain other information regarding the user's place of interest from a remote source (block 508). For example, the user profile information module 143 can search the Internet to obtain information regarding the identified restaurant Barbeque, and obtain information regarding the type of food that is served by the restaurant. The user profile information module 143 can then determine that the user has an interest/preference in such a type of food, and then update the user profile information accordingly (block 510).

Embodiments of the invention include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 6, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 6:
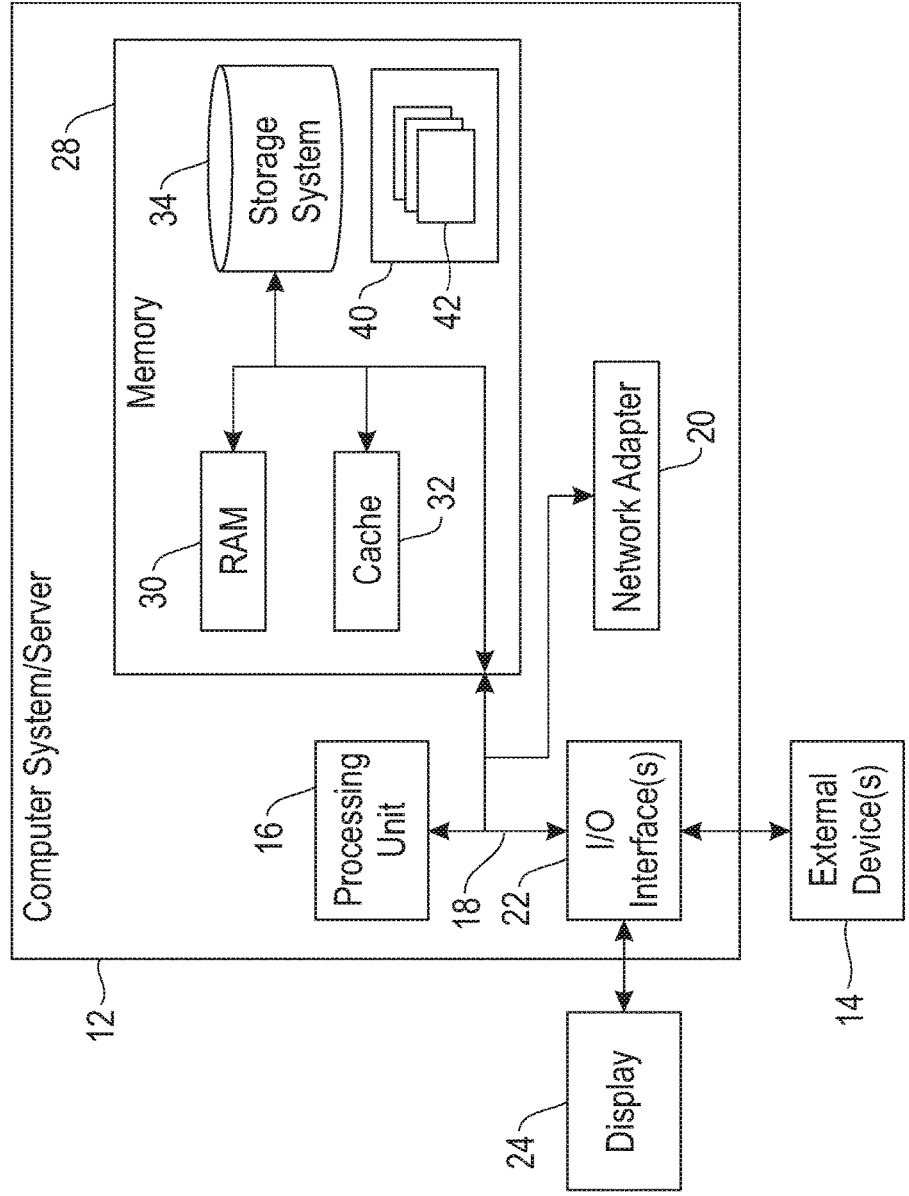
FIG. 6 illustrates a computer system that may be used to implement one or more components/steps of the techniques, according to an exemplary embodiment of the invention.

In FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

The invention claimed is:

1. A method for enhancing user profile information utility by inferring user intentions based on user conversation data and user spatio-temporal data, comprising steps of:
    temporarily buffering one or more portions of a voice conversation of a user communicating on a mobile computing device of the user;
    performing automatic speech recognition on the buffered portions of the voice conversation to detect an entity named during the voice conversation of the user;
    obtaining spatio-temporal information corresponding to the voice conversation of the user, the spatio-temporal information comprising information regarding (i) one or more locations of the user and (ii) timing of the user's presence at the one or more locations, wherein obtaining the spatio-temporal information comprises:
        determining spatio-temporal contextual information from at least one of (i) one or more keywords and (ii) one or more phrases in the voice conversation of the user which are detected as a result of the automatic speech recognition on the buffered portions of the voice conversation; and
        obtaining spatio-temporal information from one or more location services executing on the mobile computing device based on the determined spatio-temporal contextual information;
    utilizing the spatio-temporal information to disambiguate the named entity detected in the conversation of the user;
    predicting a user intention based on (i) the disambiguated named entity and (ii) the spatio-temporal information associated with the user, wherein the user intention comprises (a) a reason for the user visiting a given location and (b) a preferred mode of transportation of the user to the given location; and
    updating user profile information associated with the user based on the predicted user intention, wherein said updating comprises enabling access to the user profile information by one or more registered services executing on the mobile computing device, and presenting one or more recommendations, generated based on the user profile information, to the user;
    wherein the steps are performed by executing program code on the mobile computing device.

2. The method of claim 1, wherein said determining spatio-temporal contextual information and said obtaining spatio-temporal information based on the determined spatio-temporal contextual information comprises:
    determining a timeframe based on temporal contextual information determined from the voice conversation of the user; and
    obtaining global positioning system data corresponding to the determined timeframe;
    wherein the global positioning system data are utilized to disambiguate the named entity detected in the conversation of the user.

3. The method of claim 2, wherein said obtaining global positioning system data corresponding to the determined timeframe comprises at least one of (i) obtaining previously collected global positioning system data corresponding to the determined timeframe and (ii) setting a trigger to collect global positioning system data at a future time corresponding to the determined timeframe.

4. The method of claim 1, wherein said detecting a named entity during the conversation of the user comprises detecting at least one of (i) one or more keywords and (ii) one or more phrases in a given block of text data obtained from transcribing a voice communication of the user into text via the automatic speech recognition.

5. An article of manufacture for enhancing user profile information utility by inferring user intentions based on user conversation data and user spatio-temporal data, the article of manufacture comprising a non-transitory computer readable storage medium having program instructions embodied therewith, the program instructions executable by a processor of a mobile computing device to cause the mobile computing device to perform a method comprising:
    temporarily buffering one or more portions of a voice conversation of a user communicating on a mobile computing device of the user;
    performing automatic speech recognition on the buffered portions of the voice conversation to detect an entity named during the voice conversation of the user;

obtaining spatio-temporal information corresponding to the voice conversation of the user, the spatio-temporal information comprising information regarding (i) one or more locations of the user and (ii) timing of the user's presence at the one or more locations, wherein obtaining the spatio-temporal information comprises:
    determining spatio-temporal contextual information from at least one of (i) one or more keywords and (ii) one or more phrases in the voice conversation of the user which are detected as a result of the automatic speech recognition on the buffered portions of the voice conversation; and
    obtaining spatio-temporal information from one or more location services executing on the mobile computing device based on the determined spatio-temporal contextual information; and
utilizing the spatio-temporal information to disambiguate the named entity detected in the conversation of the user;
predicting a user intention based on (i) the disambiguated named entity and (ii) the spatio-temporal information associated with the user, wherein the user intention comprises (a) a reason for the user visiting a given location and (b) a preferred mode of transportation of the user to the given location; and
updating user profile information associated with the user based on the predicted user intention, wherein said updating comprises enabling access to the user profile information by one or more registered services executing on the mobile computing device, and presenting one or more recommendations, generated based on the user profile information, to the user.

6. The article of manufacture of claim 5, wherein said determining spatio-temporal contextual information and said obtaining spatio-temporal information based on the determined spatio-temporal contextual information comprises:
    determining a timeframe based on temporal contextual information determined from the voice conversation of the user; and
    obtaining global positioning system data corresponding to the determined timeframe;
    wherein the global positioning system data are utilized to disambiguate the named entity detected in the conversation of the user.

7. The article of manufacture of claim 6, wherein said obtaining global positioning system data corresponding to the determined timeframe comprises at least one of (i) obtaining previously collected global positioning system data corresponding to the determined timeframe and (ii) setting a trigger to collect global positioning system data at a future time corresponding to the determined timeframe.

8. The article of manufacture of claim 5, wherein said detecting a named entity during the conversation of the user comprises detecting at least one of (i) one or more keywords and (ii) one or more phrases in a given block of text data obtained from transcribing a voice communication of the user into text via the automatic speech recognition.

9. A mobile computing device for enhancing user profile information utility by inferring user intentions based on user conversation data and user spatio-temporal data, comprising:
    a memory configured to store program instructions; and
    a processor configured to execute the program instructions stored in the memory to implement a method which comprises:
    temporarily buffering one or more portions of a voice conversation of a user communicating on a mobile computing device of the user;
    performing automatic speech recognition on the buffered portions of the voice conversation to detect an entity named during the voice conversation of the user;
    obtaining spatio-temporal information corresponding to the voice conversation of the user, the spatio-temporal information comprising information regarding (i) one or more locations of the user and (ii) timing of the user's presence at the one or more locations, wherein obtaining the spatio-temporal information comprises:
        determining spatio-temporal contextual information from at least one of (i) one or more keywords and (ii) one or more phrases in the voice conversation of the user which are detected as a result of the automatic speech recognition on the buffered portions of the voice conversation; and
        obtaining spatio-temporal information from one or more location services executing on the mobile computing device based on the determined spatio-temporal contextual information; and
    utilizing the spatio-temporal information to disambiguate the named entity detected in the conversation of the user;
    predicting a user intention based on (i) the disambiguated named entity and (ii) the spatio-temporal information associated with the user, wherein the user intention comprises (a) a reason for the user visiting a given location and (b) a preferred mode of transportation of the user to the given location; and
    updating user profile information associated with the user based on the predicted user intention, wherein said updating comprises enabling access to the user profile information by one or more registered services executing on the mobile computing device, and presenting one or more recommendations, generated based on the user profile information, to the user.

10. The mobile computing device of claim 9, wherein said determining spatio-temporal contextual information and said obtaining spatio-temporal information based on the determined spatio-temporal contextual information comprises:
    determining a timeframe based on temporal contextual information determined from the voice conversation of the user; and
    obtaining global positioning system data corresponding to the determined timeframe;
    wherein the global positioning system data are utilized to disambiguate the named entity detected in the conversation of the user.

11. The mobile computing device of claim 10, wherein said obtaining global positioning system data corresponding to the determined timeframe comprises at least one of (i) obtaining previously collected global positioning system data corresponding to the determined timeframe and (ii) setting a trigger to collect global positioning system data at a future time corresponding to the determined timeframe.

12. The mobile computing device of claim 9, wherein said detecting a named entity during the conversation of the user comprises detecting at least one of (i) one or more keywords and (ii) one or more phrases in a given block of text data obtained from transcribing a voice communication of the user into text via the automatic speech recognition.

* * * * *